UNITED STATES PATENT OFFICE.

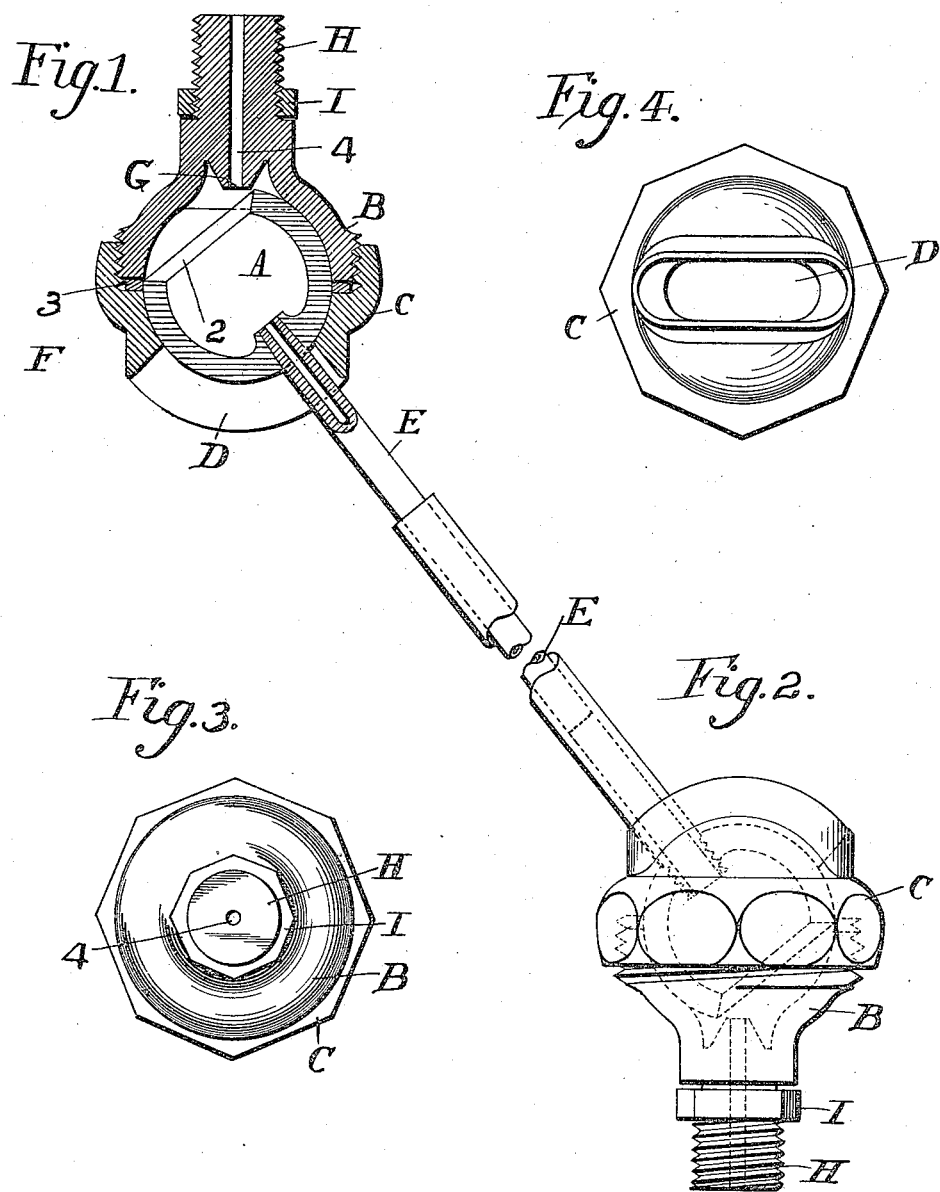

FRANK J. LANE, OF HANNIBAL, MISSOURI.

JOINT FOR TELESCOPIC OILING DEVICES.

No. 861,993.　　　　Specification of Letters Patent.　　　　Patented July 30, 1907.

Application filed March 29, 1906. Serial No. 308,716.

*To all whom it may concern:*

Be it known that I, FRANK J. LANE, a citizen of the United States, and a resident of Hannibal, Marion county, Missouri, have invented certain new and useful Improvements in Joints for Telescopic Oiling Devices, of which the following is a specification containing a full, clear, and exact description, reference being had to the accompanying drawings, forming a part hereof.

My invention relates to improvements in engine cross-head and eccentric oiling devices, in which an oil cup is attached to a suitable stand of pipe and fittings, or other material, and the stand attached to the frame of the engine, whereby oil is transmitted to the bearing and moving parts by means of telescopic tubes with ball and socket joints at their extremities connecting said oil cup with the moving parts.

The objects of my invention are: firstly, to provide an easily applied joint for the connection of the telescopic tubes with the oil cup, bearing and moving parts; secondly, to provide for the proper adjustment of the joints to take up lost motion and wear; thirdly, to prevent the leakage of oil around the joints; and fourthly, to standardize the joints by making the joint connected with the oil cup and the joint connected to a bearing and moving part so similar, and so constructed that they may be applied to any moving part and to any type of engine as above described. I attain these objects by means of the mechanisms shown in the accompanying drawings, in which Figure 1 is a sectional elevation of the joint; Fig. 2 represents Fig. 1 reversed, and shows the application of the joints to the telescopic tubes; Fig. 3 is a top view of Fig. 1, and shows its general exterior appearance; Fig. 4 is a bottom view of the casing shown in Fig. 1.

Similar letters refer to similar parts throughout the several views.

The hollow ball A has a circular opening, 2, and is tapped to receive the tube E, and said ball is incased in a socket or shell formed in two parts, B and C, threaded and fitted to form a rigid pocket for the ball A. A gasket, 3, is placed between B and C, and is clamped upon a shoulder, F, and makes the diameter of the opening formed by B and C adjustable to allow for wear of the ball A.

A slot, D, is cut in part of the shell, C, to permit motion of the tube, E, connected to the ball, A, and allows for the oscillation of the tube E as it follows the motion of any moving part to which it may be attached.

H is to be tapped to standard thread and attached at the oil cup stand or moving part of the engine.

I is a jam nut which is tightened against the part into which H has been screwed, and prevents the joint from becoming loose and throwing the slot D out of line with the engine.

The oil from the cup attached to the stand to which the joint shown in Fig. 1 is attached, is conducted through the oil passage 4 and through the nozzle G to the hollow ball A, to the tube E and the tube E', to the duplicate of Fig. 1, as shown in Fig. 2, attached to the moving part of the engine.

I am aware that oiling devices have been made with telescopic tubes, and therefore do not claim such a combination broadly, but I do claim:

A telescopic oiling device, comprising a pair of cylindrical sockets each formed in two parts adjustably secured together, there being corresponding slots formed in the lower member of the upper socket and the upper member of the lower socket, a hollow ball having a circular opening arranged in the interior of each socket, there being tubular extensions integral with the upper member of the upper socket, and with the lower member of the lower socket, which extensions are exteriorly screw threaded, lock nuts located on the screw threaded portions of said tubular extensions, a tube extending through the slot in the lower member of the upper socket and being seated in the hollow ball in said upper socket, and a tube telescoping on the lower end of the first mentioned tube and extending through the slot in the upper member of the lower socket and being seated in the hollow ball in said lower socket; substantially as specified.

In testimony whereof, I have signed my name to this specification, in presence of two subscribing witnesses.

FRANK J. LANE.

Witnesses:
　CHARLES F. JOHNSON,
　GEO. D. CLAYTON.